United States Patent
Brodt et al.

(10) Patent No.: US 12,499,690 B2
(45) Date of Patent: Dec. 16, 2025

(54) MODEL CREATION DEVICE AND MODEL CREATION METHOD FOR AT LEAST TWO SENSOR DEVICES MOUNTED ON AND/OR IN A VEHICLE

(71) Applicant: Robert Bosch GmbH, Stuttgart (DE)

(72) Inventors: Andreas Markus Brodt, Gerlingen (DE); Stefan Fuhrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 317 days.

(21) Appl. No.: 18/452,718

(22) Filed: Aug. 21, 2023

(65) Prior Publication Data

US 2024/0078813 A1   Mar. 7, 2024

(30) Foreign Application Priority Data

Sep. 2, 2022   (DE) .................. 10 2022 209 129.9

(51) Int. Cl.
  *G06V 20/58*   (2022.01)
  *G07C 5/08*    (2006.01)

(52) U.S. Cl.
  CPC ............. *G06V 20/58* (2022.01); *G07C 5/085* (2013.01)

(58) Field of Classification Search
  CPC ...... G06V 10/764; G06V 10/94; G06V 10/96; G06V 20/59; G06V 20/56; G06V 20/58; G07C 5/085
  See application file for complete search history.

(56) References Cited

U.S. PATENT DOCUMENTS

| | | | |
|---|---|---|---|
| 10,115,029 B1* | 10/2018 | Day ................... | G06V 20/59 |
| 10,699,136 B2* | 6/2020 | Theodosis .......... | G06V 20/58 |
| 12,307,778 B1* | 5/2025 | Xu ..................... | G06V 20/54 |
| 2021/0279967 A1* | 9/2021 | Gernoth ............. | G06V 10/255 |

FOREIGN PATENT DOCUMENTS

DE   102019219923 A1   6/2021

* cited by examiner

*Primary Examiner* — Carol W Chan
(74) *Attorney, Agent, or Firm* — NORTON ROSE FULBRIGHT US LLP

(57) ABSTRACT

A model creation device for sensor devices mounted on and/or in a vehicle. The model creation device includes an electronic device and a data memory on which the assigned object data can be stored together with object IDs at an assigned memory position using the electronic device for at least some objects, and from which previously stored object data can be queried using a self-created memory table, which assigns the particular memory position to each object ID stored on the data memory under an assigned index of the memory table, and using at least one lookup table and/or one overflow table. The electronic device is configured to store, for each object ID stored on the data memory, the assigned index of the memory table at a position of the created lookup table or overflow table, which is equal to a hash value of the object ID.

13 Claims, 3 Drawing Sheets

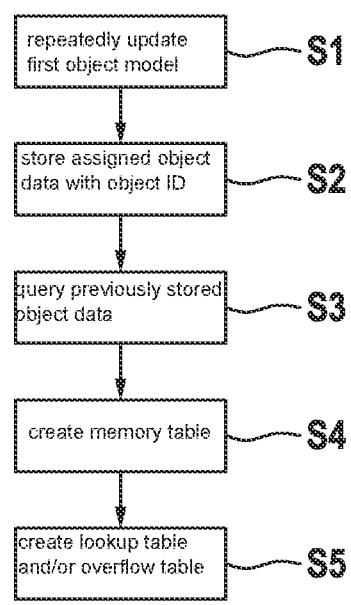

MODEL CREATION DEVICE AND MODEL CREATION METHOD FOR AT LEAST TWO SENSOR DEVICES MOUNTED ON AND/OR IN A VEHICLE

CROSS REFERENCE

The present application claims the benefit under 35 U.S.C. § 119 of German Patent Application No. DE 10 2022 209 129.9 filed on Sep. 2, 2022, which is expressly incorporated herein by reference in its entirety.

FIELD

The present invention relates to a model creation device for at least two sensor devices mounted on and/or in a vehicle, and to an environmental detection system for a vehicle. Similarly, the present invention relates to a vehicle assistance system for a vehicle and an autonomous driving system for a vehicle. Furthermore, the present invention relates to a model creation method.

BACKGROUND INFORMATION

German Patent Application No. DE 10 2019 219 923 A1 describes a device by means of which the sensor data from two different sensors of a vehicle, such as a camera and a lidar sensor, are to be made mutually plausible such that the sensor data made plausible by the device can be used for automated driving of the vehicle, for driver assistance of the vehicle or for environmental detection on the vehicle. For this purpose, the device of German Patent Application No. DE 10 2019 219 923 A1 comprises a computing device and a storage device cooperating therewith.

SUMMARY

The present invention provides a model creation device for at least two sensor devices mounted on and/or in a vehicle, an environmental detection system for a vehicle, a vehicle assistance system for a vehicle, an autonomous driving system for a vehicle, and a model creation method.

According to an example embodiment of the present invention, the model creation device for at least two sensor devices mounted on and/or in a vehicle includes:
- an electronic device, which is designed and/or programmed to read out a possible presence of at least one object in at least one partial environment of the vehicle and, if applicable, object data assigned to the at least one object based on at least a first object model repeatedly updated by a first sensor device of the sensor devices and a second object model repeatedly updated by a second sensor device of the sensor devices; and
- a data memory on which, by means of the electronic device, the assigned object data for at least some of the read-out objects can be stored together with an object ID in each case at an assigned memory position of the data memory, and from which previously stored object data can be queried by means of the electronic device using a self-created memory table, which assigns the particular memory position to each object ID stored on the data memory under an index of the memory table, which index is assigned to the object ID, and additionally using at least one lookup table and/or one overflow table;
- wherein the electronic device is additionally designed and/or programmed to create an environmental model for the at least partial environment of the vehicle, at least taking into account read-out and queried object data;
- characterized in that the electronic device is designed and/or programmed to store, for each object ID stored on the data memory, the assigned index of the memory table at a position of the created lookup table or overflow table, which is equal to a hash value of the object ID, which value is determined according to at least one predetermined hash function.

The present invention provides advantageous means for creating a reliable environmental model for at least a partial environment of a vehicle having at least two sensor devices mounted on and/or in the vehicle. In particular, the present invention allows a reliable evaluation and/or efficient matching of a first object model provided by a first sensor device of the sensor devices and a second object model provided by a second sensor device of the sensor devices by means of hardware/software that has comparatively little computing power and memory capacity, and is therefore easy to install on the particular vehicle. In particular, the hardware/software suitable for carrying out the present invention can be easily integrated into the particular vehicle as an "embedded system." Since the present invention can be implemented by means of hardware/software that not only has comparatively low resource consumption, but also has relatively low power consumption and minimized heat dissipation, the hardware/software can be readily used on the particular vehicle.

In addition, hardware/software suitable for implementing the present invention meets the regulatory safety standards for vehicles. In particular, dynamic memory need not be used to carry out the present invention.

In an advantageous embodiment of the model creation device of the present invention, the lookup table can be created by means of the electronic device such that each position of the lookup table has a memory capacity of exactly 1 byte. Alternatively or additionally, the overflow table can also be created by means of the electronic device such that each position of the overflow table has a memory capacity of exactly 1 byte. Thus, for carrying out the present invention, a lookup table and/or an overflow table, which occupy only a comparatively small total memory capacity, may be used.

In another advantageous embodiment of the model creation device of the present invention, a total number of the indexes of the memory table is less than or equal to 255. This means that only a comparatively low total memory capacity of the lookup table and/or the overflow table is required to store the indexes of the memory table.

Preferably, according to an example embodiment of the present invention, the electronic device is designed and/or programmed, if a number of objects read out from at least one of the object models is above a predetermined maximum number, to select from the set of read-out objects a total number of objects less than or equal to the maximum number, and to store only for the selected objects the assigned object data together with the object ID in each case at the assigned memory position. Such a design/programming of the electronic device advantageously contributes to the reduction of a total memory capacity of the memory table.

Preferably, according to an example embodiment of the present invention, the maximum number is less than or equal to 255. In particular, the maximum number can be less than or equal to 128, preferably less than or equal to 96. In both cases, a total number of indexes of the memory table can be less than or equal to 255.

The advantages described above are also ensured in an environmental detection system for a vehicle having such a model creation device, the first sensor device that can be mounted or is mounted on and/or in the vehicle and that is designed and/or programmed to provide the first object model, which can be read out by means of the electronic device of the model creation device, repeatedly updated to the electronic device, and the second sensor device that can be mounted or is mounted on and/or in the vehicle and that is designed and/or programmed to provide the second object model, which can be read out by means of the electronic device, repeatedly updated to the electronic device.

According to an example embodiment of the present invention, a vehicle assistance system for a vehicle having a corresponding environmental detection system and a control electronics unit, by means of which at least one component of the vehicle can be controlled taking into account the environmental model continuously recreated by the model creation device of the environmental detection system, also achieves the advantages described above.

Likewise, according to an example embodiment of the present invention, the advantages described above are also ensured in an autonomous driving system for a vehicle having such an environmental detection system and a control electronics unit, by means of which at least one component of the vehicle can be controlled taking into account the environmental model continuously recreated by the model creation device of the environmental detection system.

In an advantageous embodiment of the vehicle assistance system and the autonomous driving system according to the present invention, the model creation device is integrated into the control electronics unit.

Furthermore, carrying out a corresponding model creation method according to the present invention also creates the advantages explained above. It is expressly noted that the model creation method can be further formed in accordance with the embodiments of the model creation device and the environmental detection system explained above.

BRIEF DESCRIPTION OF THE DRAWINGS

Further features and advantages of the present invention will be explained in the following with reference to the figures.

FIG. 2 shows a flowchart for explaining an example embodiment of the model creation method, according to the present invention.

DETAILED DESCRIPTION OF EXAMPLE EMBODIMENTS

Figure 1A:
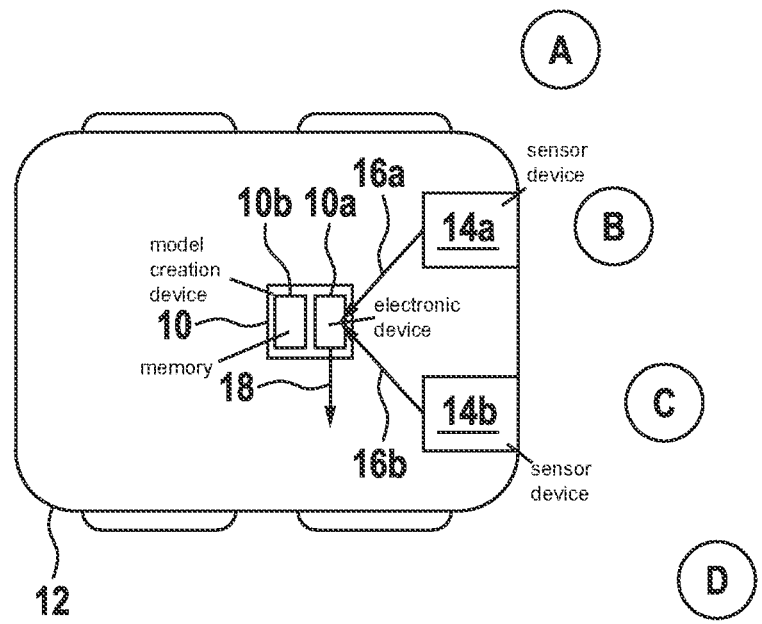
FIGS. 1A to 1C show schematic representations of an example embodiment of the model creation device according to the present invention and the data components that can be evaluated or created therewith to explain its mode of operation.
Figure 1B:
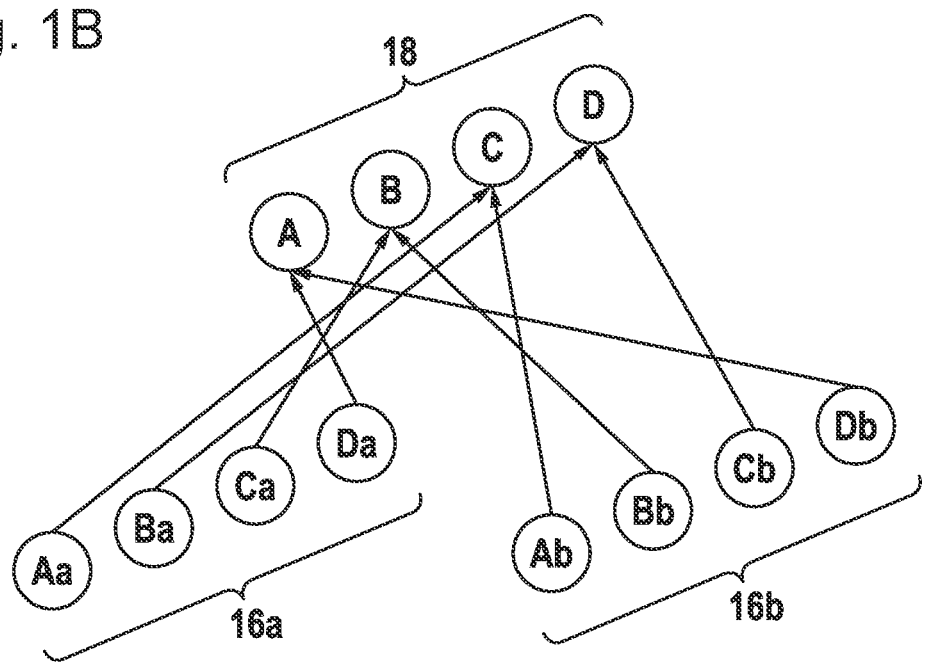
Figure 1C:
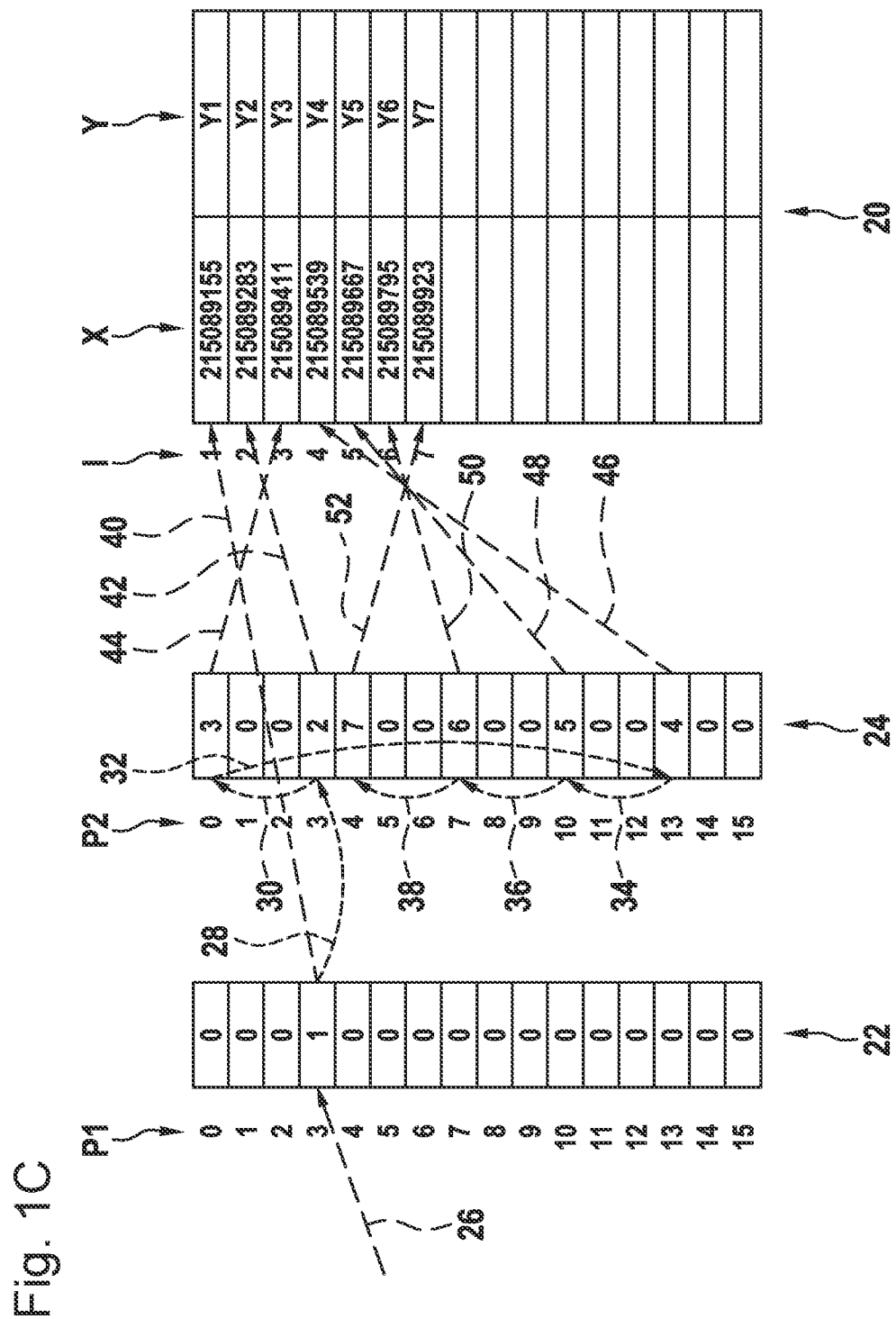

FIGS. 1A to 1C show schematic representations of an embodiment of the model creation device and the data components that can be evaluated or created therewith to explain its mode of operation.

The model creation device 10 shown schematically in FIG. 1A can be/is installed on a vehicle/motor vehicle 12, on and/or in which at least two sensor devices 14a and 14b are mounted. A usability of the model creation device 10 is not limited to any specific vehicle type/motor vehicle type of the vehicle/motor vehicle 12. Similarly, the model creation device 10 can interact with a plurality of sensor types for the at least two sensor devices 14a and 14b. The at least two sensor devices 14a and 14b may be, for example, at least one radar sensor, at least one laser scanner (lidar) and/or at least one camera. It is also noted that the at least two sensor devices 14a and 14b may be of different sensor types.

Each of the at least two sensor devices 14a and 14b is designed and/or programmed to generate, based on "raw" sensor data ascertained by means of the particular sensor device 14a or 14b, an object model 16a or 16b in each case, which can be read out by means of an electronic device 10a of the model creation device 10. For this purpose, each sensor device 14a and 14b can carry out object detection and object classification for at least one object A, B, C and D detected in at least one partial environment of the vehicle 12 using algorithms stored thereon. In particular, the object detection and object classification can be specific to the sensor type of the particular sensor device 14a or 14b. For example, the at least one object A, B, C and D can mean at least one pedestrian, at least one cyclist, at least one other vehicle/motor vehicle and/or at least one static obstacle. The at least two object models 16a and 16b created by the at least two sensor devices 14a and 14b may comprise in particular at least one sensor-specific object model 16a and 16b, which has data specific to the particular sensor type.

The electronic device 10a of the model creation device 10 is designed and/or programmed to read out a possible presence of the at least one object A, B, C and D in the at least partial environment of the vehicle 12 based on at least a first object model 16a repeatedly updated by a first sensor device 14a of the sensor devices 14a and 14b and a second object model 16b repeatedly updated by a second sensor device 14b of the sensor devices 14a and 14b. If applicable, i.e., if the at least one object A, B, C and D is present in the at least partial environment of the vehicle 12, the electronic device 10a is also designed and/or programmed to read out object data Aa to Da and Ab to Db assigned to the at least one object A, B, C and D from at least one of the at least two object models 14a and 14b.

The model creation device 10 also has a data memory 10b on which, by means of the electronic device 10a, the assigned object data Aa to Da and Ab to Db for at least some of the read-out objects A, B, C and D can be/are stored together with an assigned object ID (object identity) X in each case at an assigned memory position Y of the data memory 10b. The particular object ID X is understood to be preferably an integer number by means of which the read-out objects A, B, C and D are uniquely identified by the electronic device 10a. The object IDs X may be generated, for example, by means of a running counter of the electronic device 10a. Likewise, the object IDs X may also be defined by a complex bit field scheme containing additional information, such as specifically a sensor number, a time stamp and/or a sequence number. The object data Aa to Da and Ab to Db previously stored in the data memory 10b can be queried by means of the electronic device 10a. The querying of the previously stored object data Aa to Da and Ab to Db by means of the electronic device 10a will be discussed in more detail below.

As shown schematically in FIG. 1B, the electronic device 10a is further designed and/or programmed to create an environmental model 18 for the at least partial environment of the vehicle 12, at least taking into account read-out and queried object data Aa to Da and Ab to Db. The environmental model 18 can also be understood to be a world model. To create the environmental model 18, the object data Aa to Da and Ab to Db, which are read out from the object models 16a and 16b and are possibly temporarily stored in the data memory 10b, are fused such that, even if the same object A, B, C or D is detected by a plurality of sensor devices 14a and 14b, it exists only once in the environmental model 18. Optionally, the electronic device 10a can also take into account at least one placeholder object in one of the object models 16a or 16b, which corresponds to an object A, B, C or D not recognized by the particular sensor device 14a or 14b. The environmental model 18 is/will be continuously recreated by means of the electronic device 10a. By matching the object models 16a and 16b with the environmental model 18, new objects A, B, C or D can be introduced into the environmental model 18, previously known objects A, B, C or D can be updated in the environmental model 18, or objects A, B, C or D that are no longer detected by at least one of the sensor devices 14a and 14b can be removed from the environmental model 18.

For installing the model creation device 10 on the vehicle 12, it is advantageous if the electronic device 10a of the model creation device 10 requires only a relatively small amount of computing power and the data memory 10b needs to have only a comparatively small total memory capacity. Therefore, it is advantageous that the object data Aa to Da and Ab to Db previously stored on the data memory 10b are/can be queried by means of the electronic device 10a using a memory table 20 and additionally using at least one lookup table 22 and/or one overflow table 24. As will become clear from the following description, this efficiently reduces the amount of computer outlay required to create the environmental model 18 based on a quantity matching of the object data Aa to Da and Ab to Db.

The memory table 20 shown schematically in FIG. 1C is created by the electronic device 10a. The memory table 20 can also be referred to as a stack. Each object ID X stored on the data memory 10b is assigned, on the memory table 20, under an index I of the memory table 20 assigned to the particular object ID X, the particular memory position Y at which the object ID X, together with the object data assigned thereto Φa and Φb (with Φ=A, B, C or D), are stored on the data memory 10b. For example, under an index I=1 of the memory table 20, a first object ID X=215089155 is assigned to a first memory position Y1, wherein the first object ID X=215089155, together with object data assigned therewith Φa and Φb (with Φ=A, B, C or D), are stored at the first memory position Y1 on the data memory 10b. Accordingly, under a further index I=n (with n=2, 3 . . . to 7) of the memory table 20, an n-t object ID X= . . . can be assigned to an nth memory position Yn, in which case the n-t object ID X= . . . together with object data assigned thereto Φa and Φb (with Φ=A, B, C or D) are stored at the nth memory position Yn on the data memory 10b. Each memory position Y=Y1, Y2 . . . or Y7 stored in the memory table can also be rewritten as a "pointer to the particular object A, B, C or D." Optionally, an index I=0 of the memory table 20 can additionally be used for the state "no object detected by the sensor devices 14a and 14b." The indexes I of the memory table 20 can each consist of two tuples. For a newly detected object A, B, C or D, its object ID X and the assigned memory position Y can be appended after the last occupied index I of the memory table 20, such that no memory space of the memory table 20 is left unused between occupied indexes I.

In addition to the memory table 20, the data structure used to query the data memory 10b also has at least the lookup table 22 and/or the overflow table 24. The lookup table 22 and/or the overflow table 24 can/is also created by means of the electronic device 10a. Furthermore, the electronic device 10a is designed and/or programmed to store, for each object ID X stored in the memory table 20, the assigned index I of the memory table 20 at a position P1 of the lookup table 22 or at a position P2 of the overflow table 24, which is equal to a hash value $H_1$ to $H_n$ of the object ID X according to at least one predetermined hash function $h_1$ to $h_n$. This facilitates and accelerates the "lookup" of the index I of the memory table 20, which index is assigned to a specific object ID X, in the lookup table 22 or overflow table 24, and thus also facilitates and accelerates the reading out of the memory position Y assigned to the object ID X in the memory table 20 by means of the index I previously read out from the lookup table 22 or overflow table 24.

Due to the design/programming of the electronic device 10a for storing indexes I of the memory table 20 at the assigned position P1 of the lookup table 22 or the assigned position P2 of the overflow table 24, the data structure shown based on FIG. 1C has a comparatively low memory space requirement. Therefore, the model creation device 10 thus formed has a minimized memory requirement. Therefore, the model creation device 10 can be easily integrated on the vehicle 12. In particular, when the model creation device 10 is mounted on the vehicle 12, the problems that conventionally arise with a device according to the related art suitable for evaluating data from a plurality of sensor devices 14a and 14b due to their high memory space requirements do not arise.

Since an index I of the memory table 20 generally consists of one byte, the lookup table 22 can be implemented as an array of bytes. Empty positions P1 of the lookup table 22 preferably contain the non-index. Thus, the lookup table 22 it can be created by the electronic device 10a such that each position P1 of the lookup table 22 has a memory capacity of exactly 1 byte. Preferably, a size of the lookup table 22 corresponds to the smallest power of two that is greater than or equal to the capacity of the memory table 20. Thus, the lookup table 22 is large enough to accommodate any index I of the memory table 20. At the same time, a total memory requirement of the lookup table 22 is comparatively low.

In accordance with its use of the lookup table 22, the electronic device 10a also stores in the overflow table 24 only certain indexes I of the memory table 20. Moreover, empty positions P2 of the overflow table 24 may contain the non-index. Therefore, the overflow table 24 can also be easily created by the electronic device 10a, such that each position P2 of the overflow table 24 has a memory capacity of exactly 1 byte. Moreover, a size of the overflow table 24 need not exceed the smallest power of two that is greater than or equal to the capacity of the memory table 20. Therefore, a total memory requirement of the overflow table 24 is also relatively low.

The low memory consumption of the model creation device 10 contributes advantageously to its runtime performance. Other advantages of the data structure shown in FIG. 1C are that its operation is possible without a dynamic memory, without external collision handling and without rebuilding in the event of an error. This also facilitates a use of the model creation device 10 on the vehicle 12.

By means of an arrow 26, FIG. 1C shows how the electronic device 10a determines the hash value $H_1$=3 for the object ID X=215089155 under the index I=1 of the memory table 20 by means of a first hash function $h_1$, wherein the first hash function $h_1$ is defined merely by way of example with:

$$h_1(X) = X \bmod s,$$

wherein s indicates the size of the lookup table 22.

Subsequently, the electronic device 10a stores the index I=1 (as the index I of the memory table 20 assigned to the object ID X=215089155) at the position P1=3 of the lookup table 22 (equal to the determined hash value $H_1$=3).

Optionally, in the event of collisions, i.e., if the same hash value $H_1$ is determined for a plurality of object IDs X in the memory table 20 according to the first hash function $h_1$, the overflow table 24 can also be used:

In the example of FIG. 1C, a hash value $H_1$=3 can also be determined for the object ID X=215089283 under the index I=2 of the memory table 20 by means of the first hash function $h_1$. However, the position P1=3 of the lookup table 22 is already occupied by the index I=1 of the memory table 20, which index is assigned to the object ID X=215089155. As indicated by means of the arrow 28, the index I=2 of the memory table 20 is therefore entered into the overflow table 24 at the position P2=3 of the overflow table 24, which is equal to the hash value $H_1$=3 of the object ID X=215089155, which value is determined according to the first hash function $h_1$.

Moreover, the object ID X=215089411 under the index I=3 of the memory table 20 has the hash value $H_1$=3 according to the hash function $h_1$, but the position P1=3 of the lookup table 22 and the position P2=3 of the overflow table 24 are already occupied. Therefore, a hash value $H_2$=0 is determined by means of a second hash function $h_2$, wherein the second hash function $h_2$ is defined merely by way of example with:

$$h_2(X)=h_1(X*5).$$

Accordingly, as shown by means of the arrow 30, the index I=3 of the memory table 22 is stored in the overflow table 24 at the position P2=0 of the overflow table 24, which is equal to the hash value $H_2$=0 of the object ID X=215089411, which value is determined according to the second hash function $h_2$.

In addition, the object ID X=215089539 under the index I=4 of the memory table 20 also has the hash value $H_1$=3 according to the hash function $h_1$ and the hash value $H_2$=0 according to the second hash function $h_2$. The arrow 32 shows how a hash value $H_3$=13 is determined for the object ID X=215089539 according to a third hash function $h_3$, wherein the third hash function $h_3$ is defined by way of example with:

$$h_3(X)=(h_2(X)+d) \bmod x, \text{ wherein } d \text{ is a fixed distance.}$$

Subsequently, the index I=4 assigned to the object ID X=215089539 can be/is stored by means of the electronic device 10a at the position P2=13 of the overflow table 24.

As shown by means of the arrows 34, 36 and 38 in FIG. 1C, the collision handling can be continued accordingly by means of the electronic device 10a. For example, for the object IDs X stored under the indexes I=5 to 7 of the memory table 20, the further hash functions $h_n$ are used for this purpose, which are defined merely by way of example with:

$$h_n(X)=(h_{n-1}(X)+d) \bmod x, \text{ with } n \text{ as a natural number greater than or equal to 4.}$$

As can be seen from FIG. 1C, the data structure shown is also suitable for the case of a plurality of collisions at lookup tables and overflow tables 22 and 24. However, as a rule, such collisions occur relatively rarely. The pictorial reproduction of the many collisions in FIG. 1C is used only to show that such collisions do not/barely affect the usability of the data structure.

During a search for the index I of the memory table 20, which index is assigned to a certain object ID X, the hash value $H_1$ of the object ID X is first calculated by means of the hash function $h_1$. Subsequently, the index I stored in the lookup table 22 is read out at the position P1 corresponding to the hash value $H_1$, and a check is carried out in the memory table 20 under the index I read off from the lookup table 22 to determine whether the object ID X stored under the read-off index I corresponds to the object ID X searched for. As indicated by means of the arrow 40, the object ID X=215089155 can be found relatively quickly in this manner under the index I=1 of the memory table 20.

If, however, when looking in the memory table 20, it is found that the object ID X stored under the index I read off from the lookup table 22 does not match the object ID X searched for, the index I stored there is read off at the position P2 of the overflow table 24 corresponding to the hash value $H_1$. Subsequently, it is checked whether the object ID X stored under the index I read out from the overflow table 24 in the memory table 20 is the same as the object ID X searched for. The arrow 42 shows that, in this manner, the object ID X=215089283 under the index I=2 of the memory table 20 can be found early.

If, however, it is found, for an object ID X after the hash value $H_1$ has been determined according to the first hash function $h_1$, that both the object ID X under the index I of the memory table 20, which index is read out from the lookup table 22 at the position P1 equal to the determined hash value $H_1$, and the object ID X under the index I of the memory table 20, which index is read out from the overflow table 24 at the position P2 equal to the determined hash value $H_1$, deviate from the object ID searched for, then a hash value $H_2$=0 is determined by means of the second hash function $h_2$, and the index I stored there is queried from the position P2 of the overflow table 24 corresponding to the hash value $H_2$. Subsequently, it is checked whether the object ID X stored under the index I read out from the overflow table 24 in the memory table 20 is the same as the object ID X searched for. The arrow 44 shows the finding of the object ID X=215089411 under the index I=3 of the memory table 20.

If the search with the hash value $H_2$ determined according to the second hash function $h_2$ for an object ID X does not lead to success, the assigned hash value $H_3$ can be determined for the same object ID X by means of the third hash function $h_3$. Then, it can be examined whether the object ID X stored under the index I read out from the overflow table 24 in the memory table 20 is equal to the object ID X searched for. As shown by means of the arrow 46 in FIG. 1C, the object ID X=215089539 can be found in this manner under the index I=4 of the memory table 20.

The arrows 48, 50 and 52 show that if the search using the hash value $H_3$ determined according to the third hash function $h_3$ for an object ID X is unsuccessful, the search can be continued accordingly by means of at least one hash value $H_n$ determined using at least one further hash function $h_n$.

Thus, the lookup table 22 and the overflow table 24 allow an efficient search for a specific object ID X in the memory table 20, or for the memory position Y stored for the particular object ID X in the memory table 20. Alternatively, however, co-use of the overflow table 24 can be dispensed with by carrying out appropriate collision handling on the lookup table 22. Likewise, co-use of the lookup table 22 can be dispensed with. Furthermore, the examples of hash functions $h_1$ to $h_n$ listed above are not to be interpreted restrictively.

Preferably, the electronic device 10a is designed and/or programmed such that, if a number of objects A, B, C and D read out from at least one of the object models 16a and 16b is above a predetermined maximum number, a total number of objects can be/is selected by means of the electronic device 10a from the set of read-out objects A, B, C and D, which total number is less than or equal to the maximum number. Preferably, the maximum number is less than or equal to 255, in particular less than or equal to 128, especially less than or equal to 96. Insofar as the electronic device 10a is additionally designed and/or programmed to provide only for the selected objects assigned object data Φa and Φb (with Φ=A, B, C or D) together with the object ID X in each case at the assigned memory position Y, a total number of its indexes I less than or equal to 255, in particular less than or equal to 128, especially less than or equal to 96 is sufficient for the memory table 20. This minimizes a memory requirement of the data structure shown in FIG. 1C.

The model creation device 10 described above can be part of an environmental detection system, together with the first sensor device 14a, which is designed and/or programmed to provide the first object model 16a, which can be read out by means of the electronic device 10a of the model creation device 10, repeatedly updated to the electronic device 10a, and the second sensor device 14b, which is designed and/or programmed to provide the second object model 16b, which can be read out by means of the electronic device 10a, repeatedly updated to the electronic device 10. The environmental detection system also brings about the advantages explained above.

Optionally, the environmental detection system can also be part of a vehicle assistance system that is equipped with a (not outlined) control electronics unit by means of which at least one component of the vehicle 12 can be/is controlled taking into account the environmental model 18 continuously recreated by the model creation device 10 of the environmental detection system. Preferably, in this case, the model creation device 10 is integrated into the control electronics unit. The vehicle assistance system can be, for example, adaptive cruise control or an emergency brake assistant.

Alternatively, an autonomous driving system can also be equipped with such an environmental detection system, wherein the autonomous driving system additionally has a control electronics unit, by means of which at least one component of the vehicle 12 can be/is controlled taking into account the environmental model 18 continuously recreated by the model creation device 10 of the environmental detection system. If necessary, the model creation device 18 can be integrated into the control electronics unit of the autonomous driving system.

FIG. 2 shows a flowchart for explaining one embodiment of the model creation method.

The model creation method described in the following can be carried out on (almost) any vehicle/motor vehicle on and/or in which at least two sensor devices are mounted. The feasibility of the model creation method is not limited to any specific vehicle type/motor vehicle type of the vehicle/motor vehicle 12. Furthermore, the feasibility of the model creation method is also not limited to a specific sensor type of the at least two sensor devices. In particular, the at least two sensor devices of the particular vehicle/motor vehicle can also be of different sensor types.

In a method step S1 of the model creation method, at least a first object model repeatedly updated by a first sensor device of the sensor devices of the vehicle and a second object model repeatedly updated by a second sensor device of the sensor devices of the vehicle are used to read out whether at least one object is present in at least one partial environment of the vehicle. If necessary, i.e., if the at least one object is detected in at least the partial environment of the vehicle by at least one of the sensor devices, object data assigned to the at least one object are also read out from at least one of the object models of the sensor devices in the method step S1. The method step S1 can be repeated continuously.

In a further method step S2, for at least some of the read-out objects, the assigned object data are stored together with an object ID in each case at an assigned memory position of a data memory. At a later time, the previously stored object data are queried by the data memory in a method step S3. The querying of the previously stored object data by the data memory is performed using a memory table and additionally using at least one lookup table and/or one overflow table. Therefore, a method step S4 is also carried out, in which the memory table is created. When creating the lookup table, the particular memory position is assigned to each object ID stored on the data memory under an index of the memory table, which index is assigned to the object ID. Furthermore, the lookup table and/or the overflow table are additionally created in method step S5. For this purpose, for each object ID stored on the data memory, the assigned index of the memory table is stored at a position of the created lookup table or overflow table, which is equal to a hash value of the object ID determined according to at least one predetermined hash function. The method steps S2 to S4 can also be repeated as often as desired, wherein the method steps S2 and S4 can overlap in time or run simultaneously.

In addition, in a method step S5, an environmental model for the at least partial environment of the vehicle is created, at least taking into account read-out and queried object data. The method step S5 can also be repeated over and over again. As is clear from the preceding description, the advantageous design of the lookup table and/or overflow table significantly reduces the amount of memory required to create the environmental model.

What is claimed is:

1. A model creation device for at least two sensor devices mounted on and/or in a vehicle, the model creation device comprising:
   an electronic device configured to read out a possible presence of at least one object in at least one partial environment of the vehicle and object data assigned to each of the at least one object based on at least a first object model repeatedly updated by a first sensor device of the at least two sensor devices, and based on a second object model repeatedly updated by a second sensor device of the at least two sensor devices; and
   a data memory on which, using the electronic device, the assigned object data for at least some of the at least one object each can be stored together with an object ID at an assigned respective memory position of the data memory, and from which previously stored object data can be queried by the electronic device using a self-created memory table, which assigns a respective memory position to each object ID stored on the data memory under an index of the self-created memory table, the index being assigned to the object ID, and additionally using at least one lookup table and/or one overflow table;
   wherein the electronic device is additionally configured to create an environmental model for the at least one partial environment of the vehicle, at least taking into account read-out and queried object data;

wherein the electronic device is configured to store, for each object ID stored on the data memory, the index of the self-created memory table at a position of the lookup table or overflow table, which is equal to a hash value of the object ID, the hash value being determined according to at least one predetermined hash function.

2. The model creation device according to claim 1, wherein the lookup table is created using the electronic device such that each position of the lookup table has a memory capacity of exactly 1 byte.

3. The model creation device according to claim 1, wherein the overflow table is created using the electronic device such that each position of the overflow table has a memory capacity of exactly 1 byte.

4. The model creation device according to claim 1, wherein a total number of indexes of the self-created memory table is less than or equal to 255.

5. The model creation device according to claim 1, wherein when a number of objects read out from at least one of the first or second object models is above a predetermined maximum number, the electronic device is configured to select, from a set of read-out objects, a total number of objects less than or equal to the predetermined maximum number, and to store only for selected objects the assigned object data together with the object ID in each case at the assigned respective memory position.

6. The model creation device according to claim 5, wherein the predetermined maximum number is less than or equal to 255.

7. The model creation device according to claim 6, wherein the predetermined maximum number is less than or equal to 96.

8. An environmental detection system for a vehicle comprising:
a model creation device for at least two sensor devices mounted on and/or in the vehicle, the model creation device including:
an electronic device configured to read out a possible presence of at least one object in at least one partial environment of the vehicle and object data assigned to each of the at least one object based on at least a first object model repeatedly updated by a first sensor device of the at least two sensor devices, and a second object model repeatedly updated by a second sensor device of the at least two sensor devices, and
a data memory on which, using the electronic device, the assigned object data for at least some of the at least one object each can be stored together with an object ID at an assigned respective memory position of the data memory, and from which previously stored object data can be queried by the electronic device using a self-created memory table, which assigns a respective memory position to each object ID stored on the data memory under an index of the self-created memory table, the index being assigned to the object ID, and additionally using at least one lookup table and/or one overflow table,
wherein the electronic device is additionally configured to create an environmental model for the at least one partial environment of the vehicle, at least taking into account read-out and queried object data,
wherein the electronic device is configured to store, for each object ID stored on the data memory, the index of the self-created memory table at a position of the lookup table or overflow table, which is equal to a hash value of the object ID, the hash value being determined according to at least one predetermined hash function;
the first sensor device that can be mounted or is mounted on and/or in the vehicle and that is configured to provide the repeatedly updated first object model, which can be read out by the electronic device of the model creation device, to the electronic device; and
the second sensor device that can be mounted or is mounted on and/or in the vehicle and that is configured to provide the repeatedly updated second object model, which can be read out by the electronic device, to the electronic device.

9. A vehicle assistance system for a vehicle, comprising:
an environmental detection system for the vehicle including:
a model creation device for at least two sensor devices mounted on and/or in the vehicle, the model creation device including:
an electronic device configured to read out a possible presence of at least one object in at least one partial environment of the vehicle and object data assigned to each of the at least one object based on at least a first object model repeatedly updated by a first sensor device of the at least two sensor devices, and a second object model repeatedly updated by a second sensor device of the at least two sensor devices, and
a data memory on which, using the electronic device, the assigned object data for at least some of the at least one object each can be stored together with an object ID at an assigned respective memory position of the data memory, and from which previously stored object data can be queried by the electronic device using a self-created memory table, which assigns a respective memory position to each object ID stored on the data memory under an index of the self-created memory table, the index being assigned to the object ID, and additionally using at least one lookup table and/or one overflow table,
wherein the electronic device is additionally configured to create an environmental model for the at least one partial environment of the vehicle, at least taking into account read-out and queried object data,
wherein the electronic device is configured to store, for each object ID stored on the data memory, the index of the self-created memory table at a position of the lookup table or overflow table, which is equal to a hash value of the object ID, the hash value being determined according to at least one predetermined hash function;
the first sensor device that can be mounted or is mounted on and/or in the vehicle and that is configured to provide the repeatedly updated first object model, which can be read out by the electronic device of the model creation device, to the electronic device; and
the second sensor device that can be mounted or is mounted on and/or in the vehicle and that is configured to provide the repeatedly updated second object model, which can be read out by the electronic device, to the electronic device; and
a control electronics unit, by which at least one component of the vehicle can be controlled taking into account the environmental model continuously recreated by the model creation device of the environmental detection system.

10. The vehicle assistance system according to claim 9, wherein the model creation device is integrated into the control electronics unit.

11. An autonomous driving system for a vehicle, comprising:
an environmental detection system for the vehicle including:
a model creation device for at least two sensor devices mounted on and/or in the vehicle, the model creation device including:
an electronic device configured to read out a possible presence of at least one object in at least one partial environment of the vehicle and object data assigned to each of the at least one object based on at least a first object model repeatedly updated by a first sensor device of the at least two sensor devices, and a second object model repeatedly updated by a second sensor device of the at least two sensor devices, and
a data memory on which, using the electronic device, the assigned object data for at least some of the at least one object each can be stored together with an object ID at an assigned respective memory position of the data memory, and from which previously stored object data can be queried by the electronic device using a self-created memory table, which assigns a respective memory position to each object ID stored on the data memory under an index of the self-created memory table, the index being assigned to the object ID, and additionally using at least one lookup table and/or one overflow table,
wherein the electronic device is additionally configured to create an environmental model for the at least one partial environment of the vehicle, at least taking into account read-out and queried object data,
wherein the electronic device is configured to store, for each object ID stored on the data memory, the index of the self-created memory table at a position of the lookup table or overflow table, which is equal to a hash value of the object ID, the hash value being determined according to at least one predetermined hash function;
the first sensor device that can be mounted or is mounted on and/or in the vehicle and that is configured to provide the repeatedly updated first object model, which can be read out by the electronic device of the model creation device, to the electronic device; and
the second sensor device that can be mounted or is mounted on and/or in the vehicle and that is configured to provide the repeatedly updated second object model, which can be read out by the electronic device, to the electronic device; and
a control electronics unit, by which at least one component of the vehicle can be controlled taking into account the environmental model continuously recreated by the model creation device of the environmental detection system.

12. The autonomous driving system according to claim 11, wherein the model creation device is integrated with the control electronics unit.

13. A model creation method, comprising the following steps:
reading out, based on at least a first object model repeatedly updated by a first sensor device mounted on and/or in a vehicle and a second object model repeatedly updated by a second sensor device mounted on and/or in the vehicle, whether at least one object is present in at least one partial environment of the vehicle and object data assigned to the at least one object;
for each of at least some of the at least one object, storing the assigned object data together with an object ID in each case at an assigned respective memory position of a data memory;
querying previously stored object data from the data memory using a memory table, which assigns a respective memory position to each object ID stored on the data memory under an index of the memory table, the index being assigned to the object ID, and additionally using at least one lookup table and/or one overflow table; and
creating an environmental model for the at least one partial environment of the vehicle, at least taking into account read-out and queried object data;
wherein, for each object ID stored on the data memory, the index of the memory table is stored at a position of the lookup table or overflow table, which is equal to a hash value of the object ID, the hash value being determined according to at least one predetermined hash function.

\* \* \* \* \*